US007402932B2

(12) United States Patent
Applegate

(10) Patent No.: US 7,402,932 B2
(45) Date of Patent: Jul. 22, 2008

(54) APPARATUS AND SYSTEM FOR DRIVING A FAN USING A LINEAR INDUCTION MOTOR

(76) Inventor: Rodney W. Applegate, 9811 Shady La., Fort Worth, TX (US) 76126

( * ) Notice: Subject to any disclaimer, the term of this patent is extended or adjusted under 35 U.S.C. 154(b) by 0 days.

(21) Appl. No.: 11/345,264

(22) Filed: Jan. 31, 2006

(65) Prior Publication Data
US 2006/0197394 A1  Sep. 7, 2006

Related U.S. Application Data

(60) Provisional application No. 60/648,831, filed on Jan. 31, 2005, provisional application No. 60/656,347, filed on Feb. 25, 2005.

(51) Int. Cl.
*H02K 21/12* (2006.01)
(52) U.S. Cl. .................... 310/156.37; 310/112
(58) Field of Classification Search ................. 310/266, 310/268, 112, 26, 156.36, 156.37, 60 A, 61–63; 417/321, 410.1
See application file for complete search history.

(56) References Cited

U.S. PATENT DOCUMENTS

| 4,358,693 | A | * | 11/1982 | Palmer et al. ................. 310/46 |
| 4,883,982 | A | * | 11/1989 | Forbes et al. .................. 310/62 |
| 6,489,696 | B2 | * | 12/2002 | Sashino et al. ................ 310/43 |
| 6,531,799 | B1 | * | 3/2003 | Miller .......................... 310/114 |
| 6,958,556 | B2 | * | 10/2005 | Kurosawa et al. ......... 310/49 R |
| 7,071,592 | B1 | * | 7/2006 | Lu ......................... 310/156.25 |

* cited by examiner

*Primary Examiner*—Dang D Le
(74) *Attorney, Agent, or Firm*—Daniel J. Chalker; Chalker Flores, LLP

(57) ABSTRACT

The present invention provides a system and apparatus that includes an induction motor and/or a fan assembly. The motor includes a housing having an aperture and a shaft axially disposed within the housing and having an end extending through the aperture. The motor also includes a rotor that has one or more sets of radius extenders connected to the shaft within the housing, and a stator disposed within the housing and separated from the rotor by an air gap. The rotor typically includes one or more sets of permanent magnets attached along a perimeter of the radius extenders and at least a portion of the radius extenders is made of a magnetically conductive material. The stator typically includes a core structure of magnetically conductive material having a set of slots arranged on an internal face of the core structure and one or more sets of coils disposed within the slots.

7 Claims, 22 Drawing Sheets

US 7,402,932 B2

APPARATUS AND SYSTEM FOR DRIVING A FAN USING A LINEAR INDUCTION MOTOR

REFERENCE TO RELATED APPLICATIONS

This application claims priority to U.S. Provisional Patent Application Nos. 60/648,831 filed Jan. 31, 2005 and 60/656,347 filed Feb. 25, 2005, both of which are entitled "Apparatus and System for Driving a Fan Using a Linear Induction Motor" and are herein incorporated by reference in their entirety.

TECHNICAL FIELD OF THE INVENTION

The present invention relates, in general, to the field of motors, and in particular, to an apparatus and system for driving a fan using a linear induction motor.

BACKGROUND OF THE INVENTION

Without limiting the scope of the invention, the background of the invention is described in connection with fans used in cooling towers. Cooling towers are heat rejection devices that extract waste heat to the atmosphere through the cooling of a water stream to a lower temperature. The heat from the water stream transferred to the air stream raises the air's temperature and its relative humidity to 100%, and this air is discharged to the atmosphere. Cooling towers are commonly used to provide cooled water for air-conditioning, manufacturing and electric power generation. Depending on the application, cooling towers can handle water streams of only a few gallons of water per minute supplied in small pipes up to hundreds of thousands of gallons per minute supplied in pipes as much as 15 feet (about 5 meters) in diameter.

As shown in FIGS. 1A and 1B, cooling towers 100 and 150 include a fan 102 that is used to draw air 104 from air inlets 106 through a fill area 108 and exhaust the heated and moist air 110 to the atmosphere. The heated water enters the cooling tower 100 and 150 via water inlets 112 that direct the heated water over the fill area 108 so that the water is cooled by the air. The cooled water is then collected and returned to the facility via water output 114. Although the design of any specific cooling tower may vary, the principles illustrated in FIGS. 1A and 1B are applicable.

The fan 102 operates in a very corrosive environment as a result of the high moisture content, velocity and elevated temperature of the air passing over the fan 102. Moreover, the moisture in the air may also contain various contaminants. Fan vibration and noise are also important operational considerations. As shown in FIG. 2, fan 102 includes a set of fan blades 200 (typically at least six) connected to a fan hub 202. The fan hub 202 is connected to a speed reducer or gearbox 206 via shaft 204. The speed reducer or gearbox 206 is connected to a motor 210 via drive connection (shaft) 208. The speed reducer or gearbox 206 is required in most cases to provide the desired torque and fan blade RPMs. For example, the fan 102 can be an adjustable multi-blade design having a minimum of six (6) fiberglass reinforced epoxy (FRE) fan blades 200 rotating at a tip speed of less than 11,000 FPM and a fan hub 202 of HDG steel plate construction. A non-corrosive metal spacer sleeve may also be provided to prevent the fan 102 from dropping onto speed reducer 206 in the event of shaft bushing failure. The speed reducer or gearbox 206 is typically of the spiral bevel, single (or double) reduction type. In addition, the speed reducer or gearbox 206 is typically bolted to a stainless steel base plate which in turn is bolted and grouted to the concrete structure. The fan motor 210 is close-coupled to the speed reducer or gearbox 206 by means of an elastomeric type coupling. The fan motor 210 is typically a three phase corrosive duty motor suitable for across line starting that is mounted to a stainless steel base plate, bolted and grouted securely to the concrete fan deck. If the fan motor 210 is located outside of the airstream, a drive connection or shaft 208 (e.g., stainless steel, full-floating type, with non-lubricated flexible couplings at both ends) is used to connect the motor 210 to the speed reducer or gearbox 206. A galvanized steel or composite guard or shaft type can also be used to prevent damage to surrounding equipment in case of shaft failure.

The fan assembly (fan 102, speed reducer or gearbox 206 and motor 210) having many moving parts that require maintenance and are prone to failure, especially when operated in the harsh environment of a cooling tower. Moreover, the installation of the fan assembly is difficult and time consuming because of the operating tolerances that must be maintained in order to align the various drive components and reduce vibration and noise.

As a result, there is a need for a system and apparatus for driving a fan that reduces the downtime caused by failures or maintenance, provides increased efficiency and reliability, and provides greater operational control.

SUMMARY OF THE INVENTION

The present invention provides a system and apparatus for driving a fan using an induction motor that reduces the downtime caused by failures or maintenance, provides increased efficiency and reliability, and provides greater operational control. The present invention can be implemented as a linear induction motor mounted in line with the fan shaft, or an integrated fan/motor assembly.

More specifically, the present invention provides a system that includes an induction motor and a fan assembly. The induction motor includes a housing having an aperture and a shaft axially disposed within the housing and having an end extending through the aperture. The induction motor also includes a rotor that has one or more sets of radius extenders (e.g., one or more sets of arms, one or more discs, one or more cylinders or a combination thereof) connected to the shaft within the housing, and a stator disposed within the housing and separated from the rotor by an air gap. The fan assembly (e.g., a set of fan blades connected to a fan hub) is secured to the end of the shaft. The rotor typically includes one or more sets of permanent magnets attached along a perimeter of the radius extenders and at least a portion of the radius extenders is made of a magnetically conductive material. The stator typically includes a core structure of magnetically conductive material (e.g., iron, a stack of laminated steel sheets, etc.) having a set of slots arranged on an internal face of the core structure and one or more sets of coils disposed within the slots. The rotor and stator are designed to provide the proper RPM and torque requirements for the fan assembly that the motor will drive.

The present invention also provides an induction motor that includes a stationary shaft, a stator disposed around the stationary shaft, a motor hub assembly axially mounted to the stationary shaft such that the motor hub assembly is free to rotate axially around the stationary shaft and a rotor attached to an interior of the motor hub assembly and separated from the stator by an air gap. A drive shaft or device mount is also attached to the motor hub assembly so that the drive shaft or device mount rotates with the motor hub assembly.

Moreover, the present invention provides an apparatus that is an integrated fan/motor unit. The apparatus includes a housing, a fan assembly, a rotor and a stator. The housing has a first aperture and a second aperture opposite to the first aperture. The fan assembly is axially disposed within the housing between the first aperture and the second aperture and includes a set of fan blades connected to a fan hub. The rotor is attached to a perimeter of the fan blades. The stator is disposed within the housing and separated from the rotor by an air gap. The apparatus may also include a shaft attached to the fan hub and a fan mount attached to the housing and the shaft such that the fan assembly is free to rotate. In addition, the apparatus may include one or more sets of permanent magnets disposed within the housing to levitate the fan assembly within the housing.

In addition, the present invention provides a motor that includes a motor housing, a shaft, a rotor and a stator. The motor housing includes a cylindrical shell, a top flange and a bottom flange. The shaft is axially disposed within the cylindrical shell and extends through the top flange. The rotor includes one or more sets of radius extenders (e.g., one or more sets of arms, one or more discs, one or more cylinders or a combination thereof) attached to the shaft. The stator is mounted to the interior of the cylindrical shell and separated from the rotor by an air gap. The rotor typically includes one or more sets of permanent magnets attached along a perimeter of the radius extenders and at least a portion of the radius extenders is made of a magnetically conductive material. The stator typically includes a core structure of magnetically conductive material (e.g., iron, a stack of laminated steel sheets, etc.) having a set of slots arranged on an internal face of the core structure and one or more sets of coils disposed within the slots.

The present invention is described in detail below with reference to the accompanying drawings.

BRIEF DESCRIPTION OF THE DRAWINGS

For a more complete understanding of the features and advantages of the present invention, reference is now made to the detailed description of the invention along with the accompanying figures and in which:

FIGS. 17J, 17K, 17L and 17M illustrate various details of the main motor housing in the induction motor of FIG. 16A.

DETAILED DESCRIPTION OF THE INVENTION

While the making and using of various embodiments of the present invention are discussed in detail below with respect to a fan driven by an induction motor for cooling towers, it should be appreciated that the present invention provides many applicable inventive concepts that can be embodied in a wide variety of specific contexts, including but not limited to, any situation where a large diameter fan is used along with a speed reducer or gearbox. As a result, the terminology used and specific embodiments discussed herein are merely illustrative of specific ways to make and use the invention and do not delimit the scope of the invention.

Figure 1A:
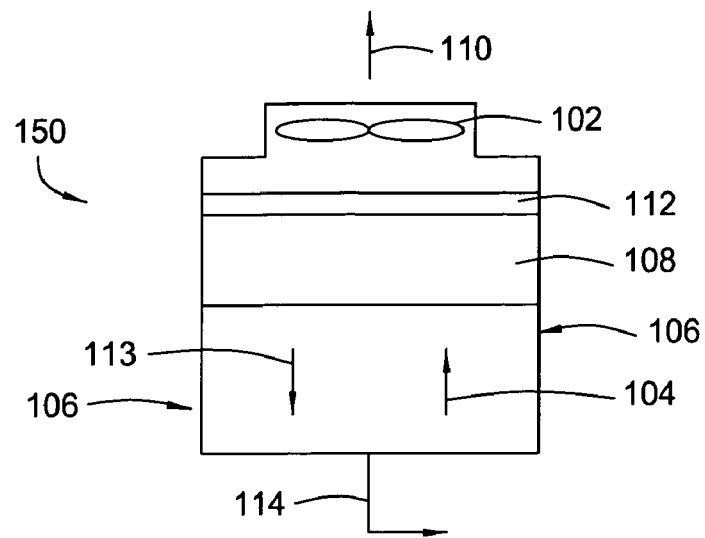
FIGS. 1A and 1B are diagrams of a cooling tower in accordance with the prior art.
Figure 1B:
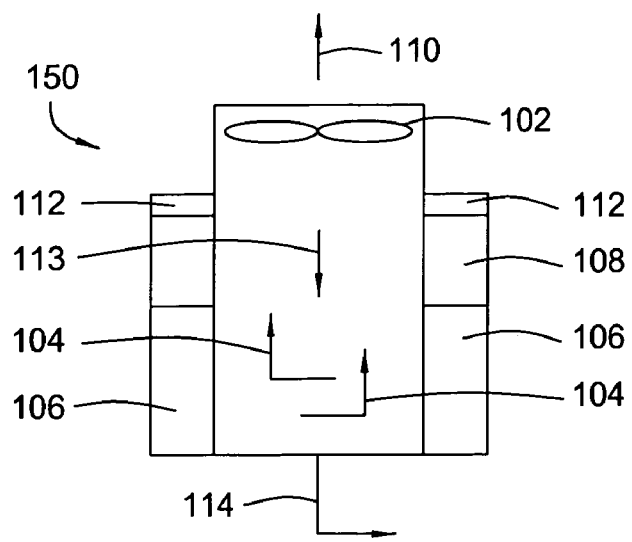
Figure 2:
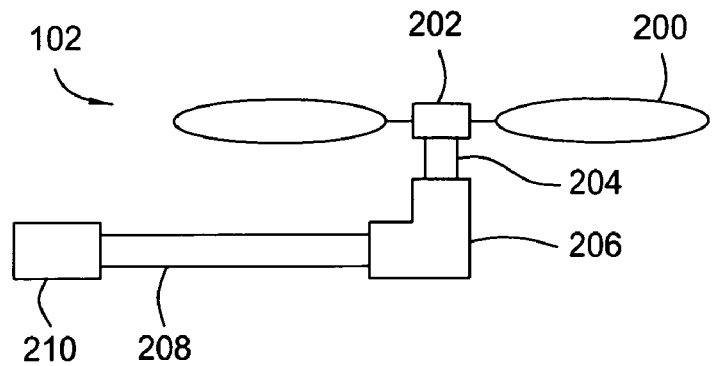
FIG. 2 is a diagram of a fan assembly for a cooling tower in accordance with the prior art.
Figure 3:
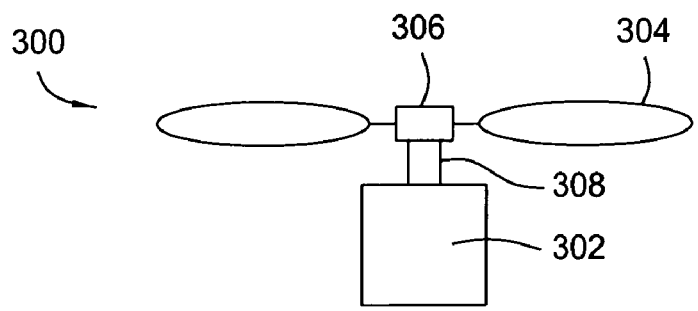
FIG. 3 is a diagram of a fan driven by an induction motor in accordance with one embodiment of the present invention.

The present invention provides a system and apparatus for driving a fan using an induction motor that reduces the downtime caused by failures or maintenance, provides increased efficiency and reliability, and provides greater operational control. The present invention can be implemented as a linear induction motor mounted in line with the fan shaft, or an integrated fan/motor assembly Now referring to FIG. 3, a diagram of a fan 300 driven by an induction motor 302 in accordance with one embodiment of the present invention is shown. The fan blades 304 are connected to a fan hub 306, which is connected to the shaft 308 of induction motor 302. The shaft 308 of the induction motor 302 is axially disposed within a housing of the induction motor and has an end that extends through an aperture of the housing. The induction motor 302 operates using linear induction principles in order to provide the needed torque with a fan blade 304 speed of less than 11,000 FPM. The induction motor 302 is controlled by a controller that may include a computer program embodied on a computer readable medium to control the direction of the fan blades 304 and speed at start up.

As will be described below in reference to FIGS. 8, 9A and 9B, a linear induction motor is implemented in a rotary configuration having a rotor that includes one or more sets of radius extenders (one or more arms, one or more discs, one or more cylinders or a combination thereof) connected to the shaft and a stator disposed within the housing and separated from the rotor by an air gap to provide the desired RPM and torque characteristics. The rotor typically includes one or more sets of permanent magnets attached along a perimeter of the radius extenders and at least a portion of the radius extenders is made of a magnetically conductive material. The stator typically includes a core structure of magnetically conductive material (e.g., iron, a stack of laminated steel sheets, etc.) having a set of slots arranged on an internal face of the core structure and one or more sets of coils disposed within the slots. This implementation is easily installed and maintained. Moreover, it can be used to retrofit existing fan assemblies.

Figure 4:
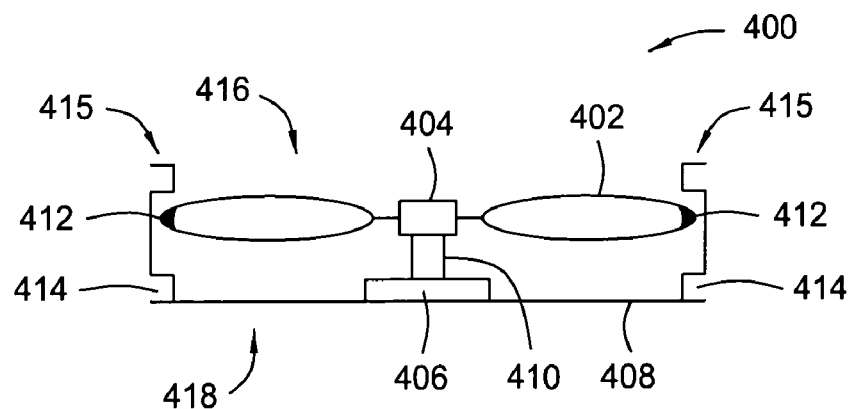
FIG. 4 is a diagram of an integrated fan/induction motor in accordance with one embodiment of the present invention.

Referring now to FIG. 4, a diagram of an integrated fan/induction motor 400 in accordance with one embodiment of the present invention is shown. The fan blades 402 are connected to a fan hub 404, which is connected to a shaft 410 that extends from fan mount 406. Fan mount 406 affixes the fan assembly to one or more supports 408 and provides stability while allowing free rotation of the fan blades 402. The fan blades 402 have one or more permanent magnets 412 (rotor) affixed to the ends of the fan blades 402. The permanent magnets 412 (rotor) extend into a housing 414 that includes a set of windings (stator) that together create the linear induction motor. The rotor and stator are separated by an air gap. The housing includes a first aperture 416 and a second aperture 418 opposite the first aperture 416. The fan assembly (402 and 404) is axially disposed within the housing 414 between the first aperture 416 and the second aperture 418. This will be described in more detail in reference to FIGS. 10A, 10B and 13.

Figure 5:
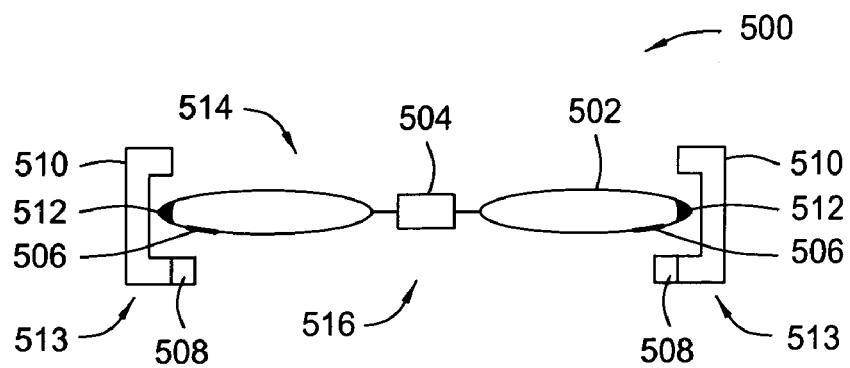
FIG. 5 a diagram of an integrated fan/induction motor in accordance with another embodiment of the present invention.

Now referring to FIG. 5, a diagram of an integrated fan/induction motor 500 in accordance with another embodiment of the present invention is shown. The fan blades 502 are connected to a fan hub 504. Since this implementation does not require a fan shaft, the size of the fan hub 504 can be reduced to provide more area for the fan blades 502. The fan blades 502 are levitated using sets of permanent magnets 506 on the fan blades 502 with corresponding oppositely aligned magnets 508 on the fan housing 510. In addition, the fan blades 502 have one or more permanent magnets 512 (rotor) affixed to the ends of the fan blades 502. The permanent magnets 512 (rotor) extend into housing 510 that includes a set of windings (stator) that together create the linear induction motor. The rotor and stator are separated by an air gap. The housing 510 includes a first aperture 514 and a second aperture 516 opposite the first aperture 514. The fan assembly (502 and 504) is axially disposed within the housing 510 between the first aperture 514 and the second aperture 516. This will be described in more detail in reference to FIGS. 11A, 11B and 13.

Figure 6:
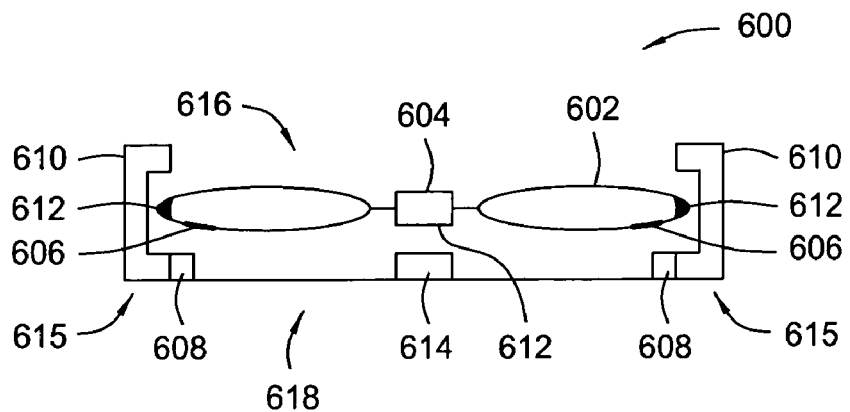
FIG. 6 a diagram of an integrated fan/induction motor in accordance with another embodiment of the present invention.

Referring now to FIG. 6, a diagram of an integrated fan/induction motor 600 in accordance with another embodiment of the present invention is shown. The fan blades 602 are connected to a fan hub 604. In this implementation the fan hub 604 has one or more permanent magnets 614 disposed above a base having one or more oppositely aligned magnets 616. The fan blades 602 are also levitated using sets of permanent magnets 606 on the fan blades 602 with corresponding oppositely aligned magnets 608 on the fan housing 610. In addition, the fan blades 602 have one or more permanent magnets 612 (rotor) affixed to the ends of the fan blades 602. The permanent magnets 612 (rotor) extend into housing 610 that includes a set of windings (stator) that together create the linear induction motor. The rotor and stator are separated by an air gap. The housing 610 includes a first aperture 616 and a second aperture 618 opposite the first aperture 616. The fan assembly (602 and 604) is axially disposed within the housing 610 between the first aperture 616 and the second aperture 618. This will be described in more detail in reference to FIGS. 11A, 11B, 12A, 12B and 13.

Figure 7:
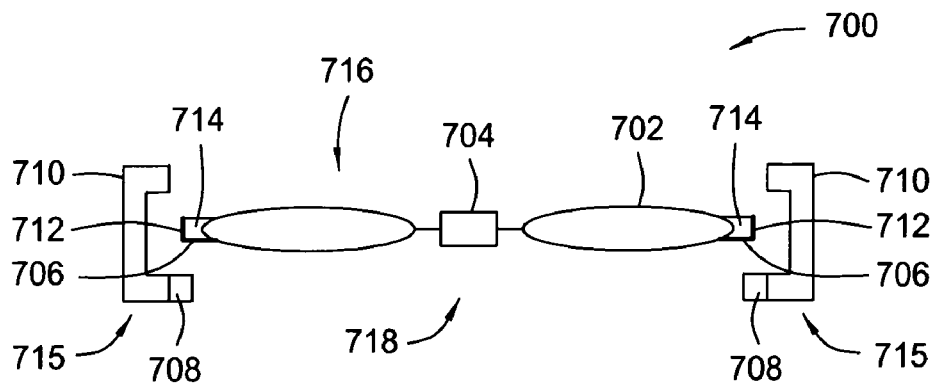
FIG. 7 a diagram of an integrated fan/induction motor in accordance with another embodiment of the present invention.

Now referring to FIG. 7, a diagram of an integrated fan/induction motor 700 in accordance with another embodiment of the present invention is shown. The fan blades 702 are connected to a fan hub 704. Since this implementation does not require a fan shaft, the size of the fan hub 704 can be reduced to provide more area for the fan blades 702. The fan blades 702 are also levitated using sets of permanent magnets 706 on a ring 714, which is connected to the ends of the fan blades 702, with corresponding oppositely aligned magnets 708 on the fan housing 710. In addition, the ring 714 also has one or more permanent magnets 712 (rotor) affixed to the ends of the ring 714. The permanent magnets 712 (rotor) extend into housing 710 that includes a set of windings (stator) that together create the linear induction motor. The rotor and stator are separated by an air gap. The housing 710 includes a first aperture 716 and a second aperture 718 opposite the first aperture 716. The fan assembly (702 and 704) is axially disposed within the housing 710 between the first aperture 716 and the second aperture 718. This will be described in more detail in reference to FIG. 14.

Figure 8:
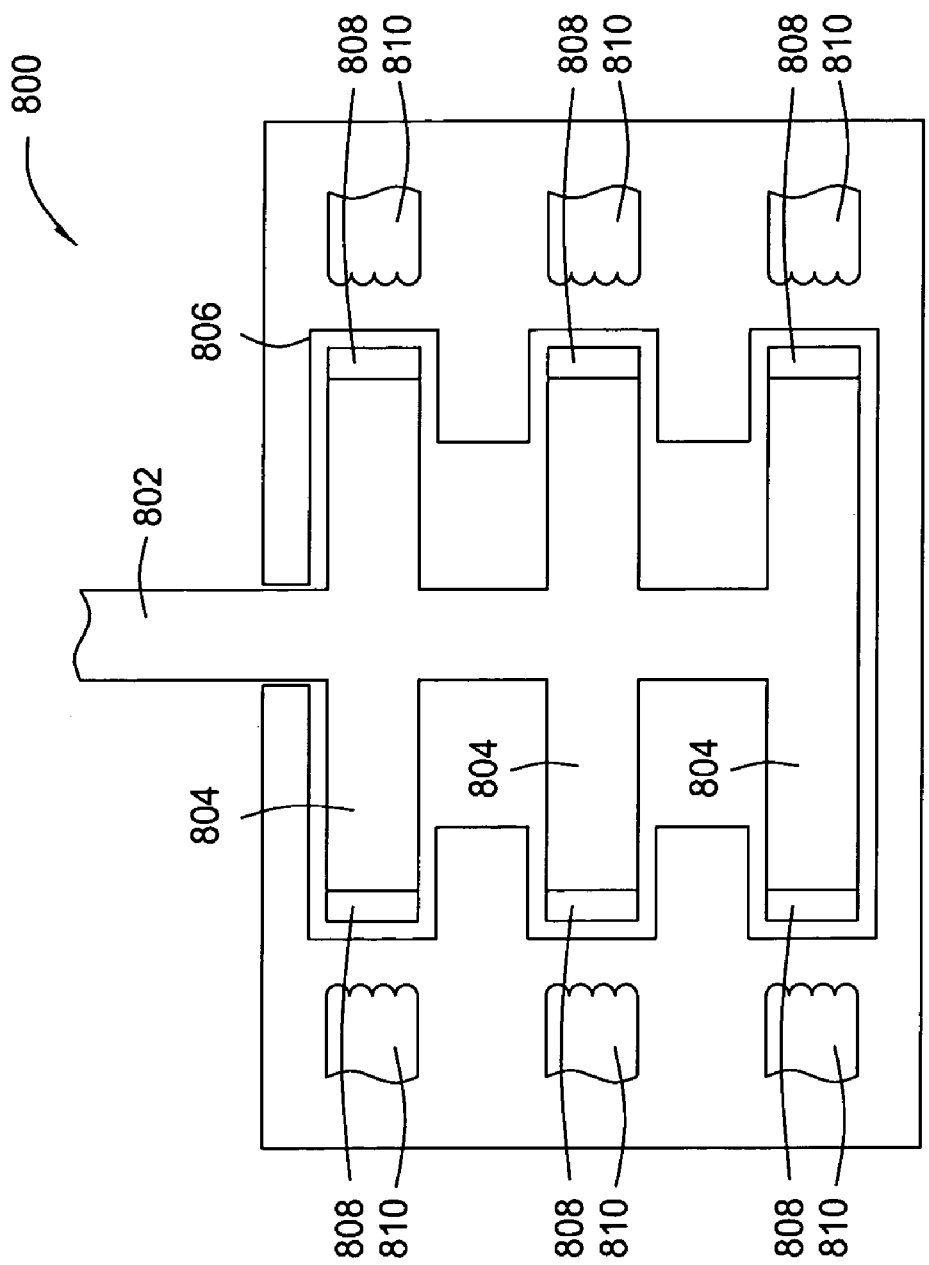
FIG. 8 is a cross section of an induction motor used to drive a shaft in accordance with one embodiment of the present invention.
Figure 9A:
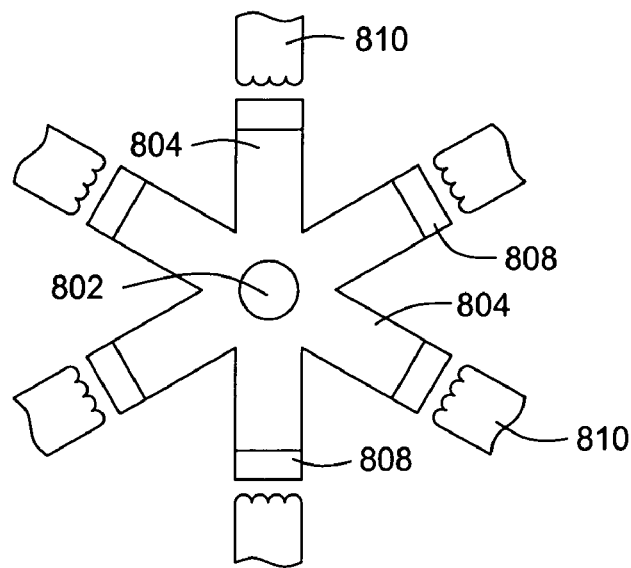
FIGS. 9A and 9B are diagrams showing a cross section of FIG. 8 in accordance with two embodiments of the present invention.
Figure 9B:
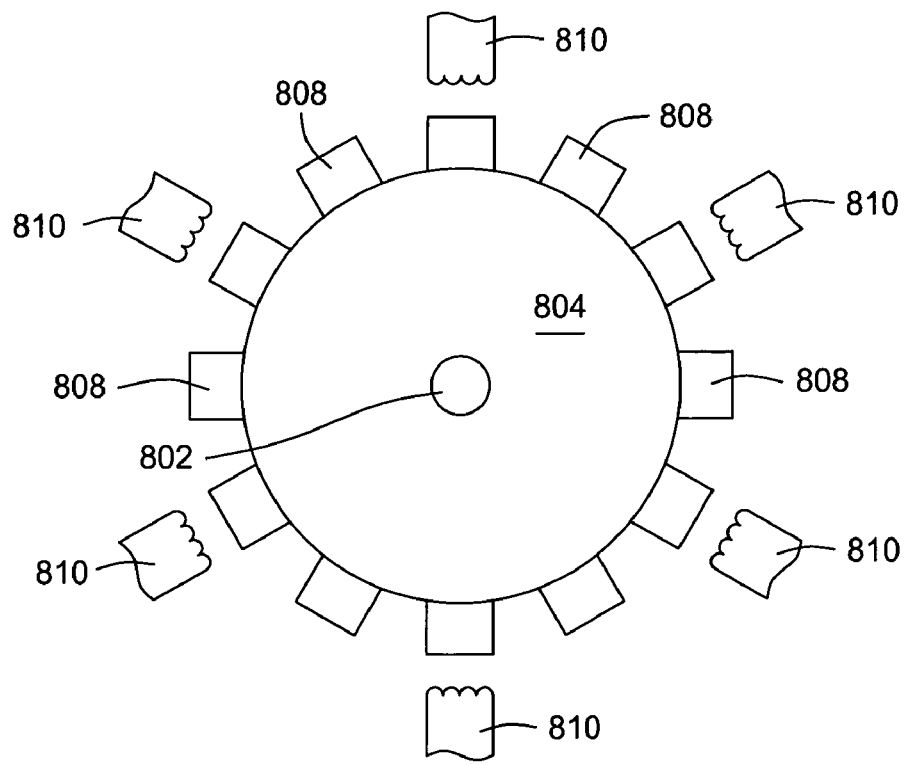

Referring now to FIG. 8, a cross section of an induction motor 800 used to drive a shaft in accordance with one embodiment of the present invention is shown. The windings and shaft of the induction motor 800 are designed to provide the proper RPM and torque requirements for the fan that the motor 800 will drive. Since the diameter of a typical shaft 802 does not provide sufficient circumference to mount the magnets necessary to produce the desired RPM and torque requirements, the shaft 802 is built with one or more sets of arms (See FIG. 9A), one or more discs (See FIG. 9B), one or more cylinders or a combination thereof. The diameter (arms, discs, cylinders or combination), the number of arms and the number of discs or sets of arms will depend on the RPM and torque specifications for the motor 800. As shown, the shaft 802 includes three discs or sets of arms 804 that extend into the motor housing 806. One or more permanent magnets 808 (rotor) are attached to the end of the arms or along the perimeter of the discs 804. The housing 806 includes sets of coils 810 (stator) around magnetic material cores (e.g., iron, laminates, etc.) to produce magnetic fields and drive the shaft 802. The stator and rotor are separated by an air gap. Note that the spacing of the coils 810 around the housing can be virtually continuous to reduce clogging. Moreover, the number of arms 804, sets of arms or discs, and coils 810 are not limited to the number or configuration shown in the FIGURES.

Figure 10A:
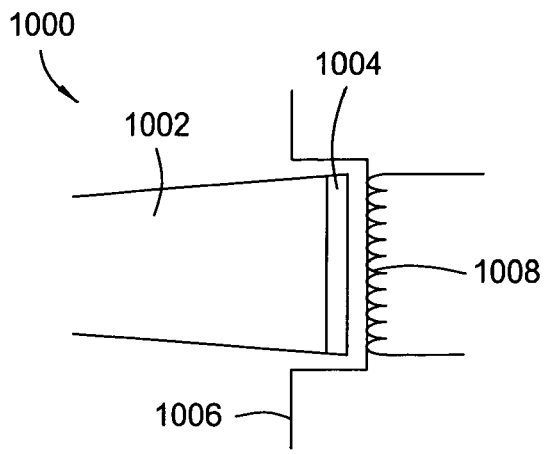
FIGS. 10A and 10B are front and end views of a fan blade of an integrated fan/induction motor in accordance with one embodiment of the present invention.
Figure 10B:
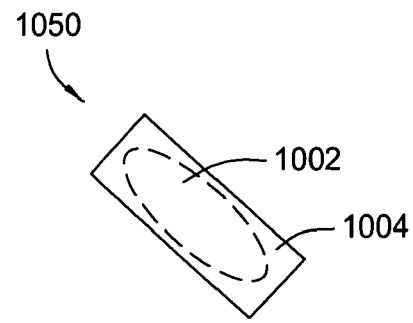

Now referring to FIGS. 10A and 10B, front 1000 and end 1050 views of a fan blade 1002 of an integrated fan/induction motor in accordance with one embodiment of the present invention are shown. Fan blade 1002 has a permanent magnet 1004 attached to the end of the fan blade 1002. Note that permanent magnet 1004 can be attached to a housing that is attached to the end of the fan blade 1002. The permanent magnet 1004 extends into housing 1006 that includes a set of windings 1008 that together create the linear induction motor.

Figure 11A:
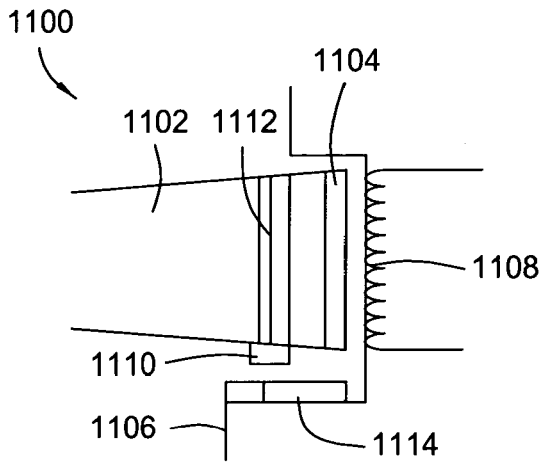
FIGS. 11A and 11B are front and end views of a fan blade of an integrated fan/induction motor in accordance with another embodiment of the present invention.
Figure 11B:
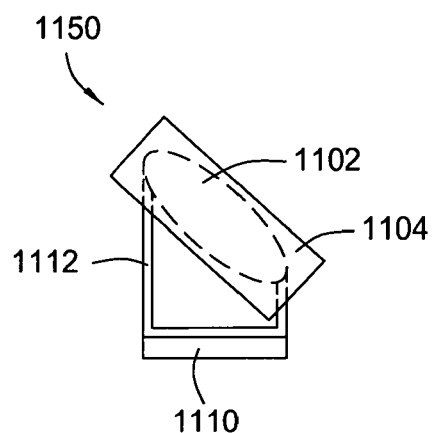

Referring now to FIGS. 11A and 11B, front 1100 and end 1150 views of a fan blade 1102 of an integrated fan/induction motor in accordance with another embodiment of the present invention are shown. Fan blade 1102 has a permanent magnet 1104 attached to the end of the fan blade 1102. Note that permanent magnet 1104 can be attached to a housing that is attached to the end of the fan blade 1102. The permanent magnet 1104 extends into housing 1106 that includes a set of windings 1108 that together create the linear induction motor. The fan blade 1102 is levitated using one or more permanent magnets 1110 affixed to a hanger 1112 that suspends the permanent magnet 1110 over an oppositely aligned set of magnets 1114 attached to the housing 1106. The magnetic repulsion effect of the oppositely aligned magnets 1110 and 1114 cause the fan blade 1102 to levitate. Magnets 1114 can be augmented with one or more coils around magnetic material cores (e.g., iron, laminates, etc.) that can be used to adjust the levitation of the fan blades 1102, which may require one or more position sensors. Such a control system can be used to maintain proper operation during changing environmental conditions or compensate for dirt or other contaminants that may build up over time. Moreover, various physical arrangements of magnets 1114 can be used, e.g., two spaced magnets with the fan blade magnet disposed above or into gap.

Figure 12A:
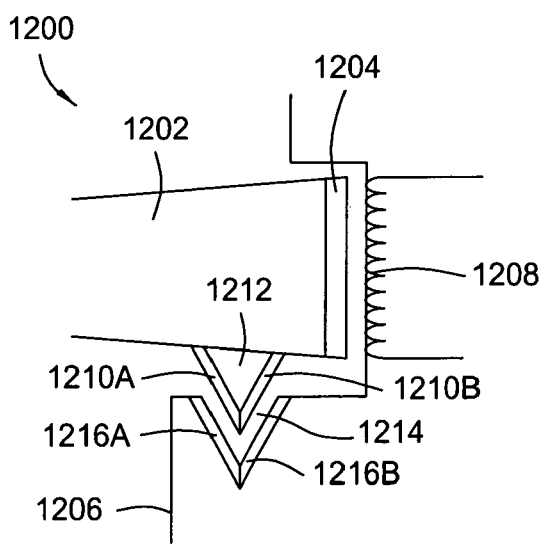
FIGS. 12A and 12B are front and end views of a fan blade of an integrated fan/induction motor in accordance with another embodiment of the present invention.
Figure 12B:
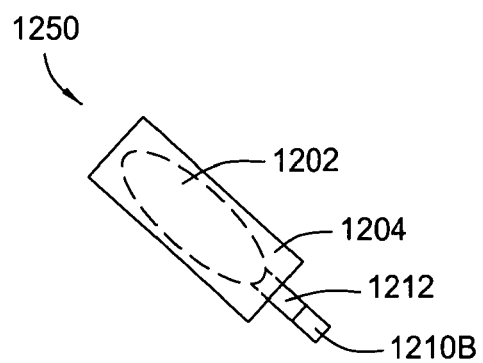

Now referring to FIGS. 12A and 12B, front 1200 and end 1250 views of a fan blade 1202 of an integrated fan/induction motor in accordance with another embodiment of the present invention are shown. Fan blade 1202 has a permanent magnet 1204 attached to the end of the fan blade 1202. Note that permanent magnet 1204 can be attached to a housing that is attached to the end of the fan blade 1202. The permanent magnet 1204 extends into housing 1206 that includes a set of windings 1208 that together create the linear induction motor. The fan blade 1102 is levitated using one or more permanent magnets 1210a and 1210b affixed to a fan extension 1212 that suspends the permanent magnets 1210a and 1210b into a recess 1214 having an oppositely aligned set of magnets 1216a and 1216b attached to the housing 1206. The magnetic repulsion effect of the oppositely aligned magnets 1210a, 1210b and 1216a, 1216b cause the fan blade 1202 to levitate. For example, the polarity of the magnets can be 1210a=N, 1210b=S, 1216a=N and 1216b=S. Magnets 1216 can be augmented with one or more coils around magnetic material cores (e.g., iron, laminates, etc.) that can be used to adjust the levitation of the fan blades 1202, which may require one or more position sensors. Such a control system can be used to maintain proper operation during changing environmental conditions or compensate for dirt or other contaminants that may build up over time.

Figure 13:
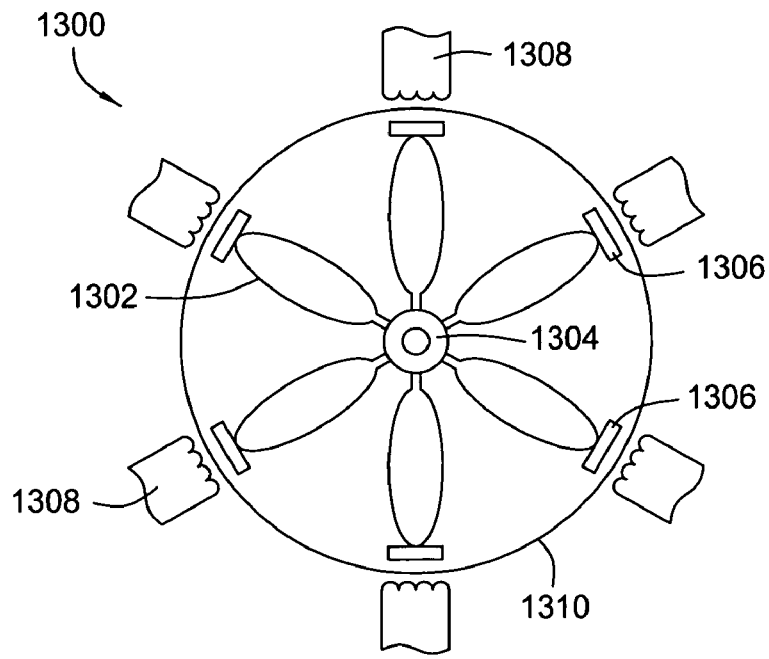
FIG. 13 is a top view of a fan of an integrated fan/induction motor in accordance with one embodiment of the present invention.

Referring now to FIG. 13, a top view of a fan 1300 of an integrated fan/induction motor in accordance with one embodiment of the present invention is shown. Fan 1300 includes a set of fan blades 1302 connected to a fan hub 1304. Each fan blade 1302 has one or more permanent magnets 1306 (rotor) attached to the end of the fan blade 1302. Fan 1300 is disposed in a housing 1310 containing a set of windings 1308 (stator) around magnetic material cores (e.g., iron, laminates, etc.) that can be energized to produce a controllable magnetic field that causes the fan blades 1302 to rotate about fan hub 1304. This combination produces a linear induction motor and a fan that are integrated into a single device. Note that the spacing of the coils 1308 around the housing 1310 can be virtually continuous to reduce clogging. Moreover, the number of fan blades 1302, magnets 1306 and coils 1308 are not limited to the number or configuration shown in the FIGURES.

Figure 14:
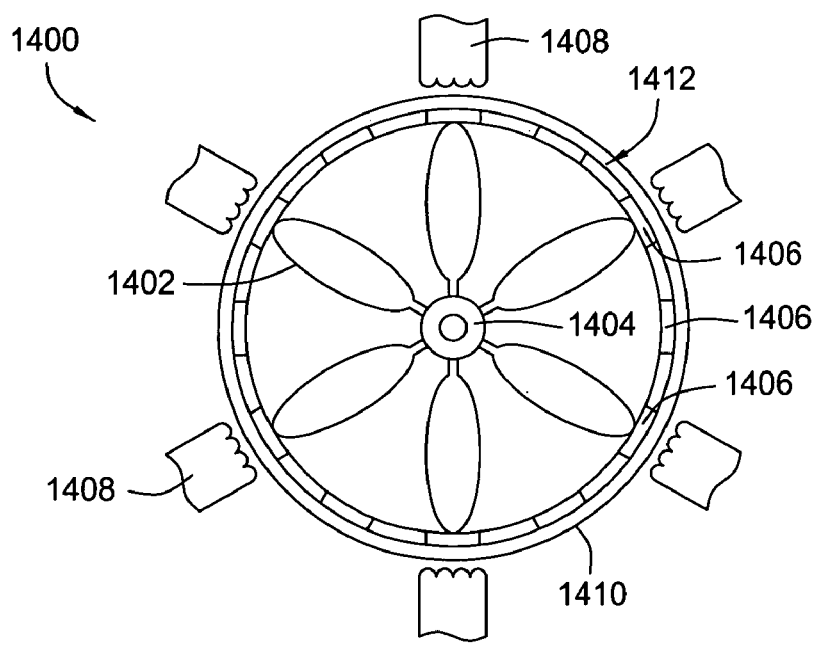
FIG. 14 is a top view of a fan of an integrated fan/induction motor in accordance with another embodiment of the present invention.

Referring now to FIG. 14, a top view of a fan 1400 of an integrated fan/induction motor in accordance with another embodiment of the present invention is shown. Fan 1400 includes a set of fan blades 1402 connected to a fan hub 1404. The fan blades 1402 are connected to a ring 1412 that contains a set permanent magnets 1406 (rotor) either attached to or inset into the ring 1412. Fan 1400 is disposed in a housing 1410 containing a set of windings 1408 (stator) around magnetic material cores (e.g., iron, laminates, etc.) that can be energized to produce a controllable magnetic field that causes the fan blades 1402 to rotate about fan hub 1404. This combination produces a linear induction motor and a fan that are integrated into a single device. Note that the spacing of the magnets 1406 around the ring 1412 and the coils 1408 around the housing 1410 can be virtually continuous to reduce clogging. Moreover, the number of fan blades 1402, magnets 1406 and coils 1408 are not limited to the number or configuration shown in the FIGURES.

A sketch of one embodiment of the present invention is attached along with two photographs of a fan are also attached after FIG. 14.

Figure 15A:
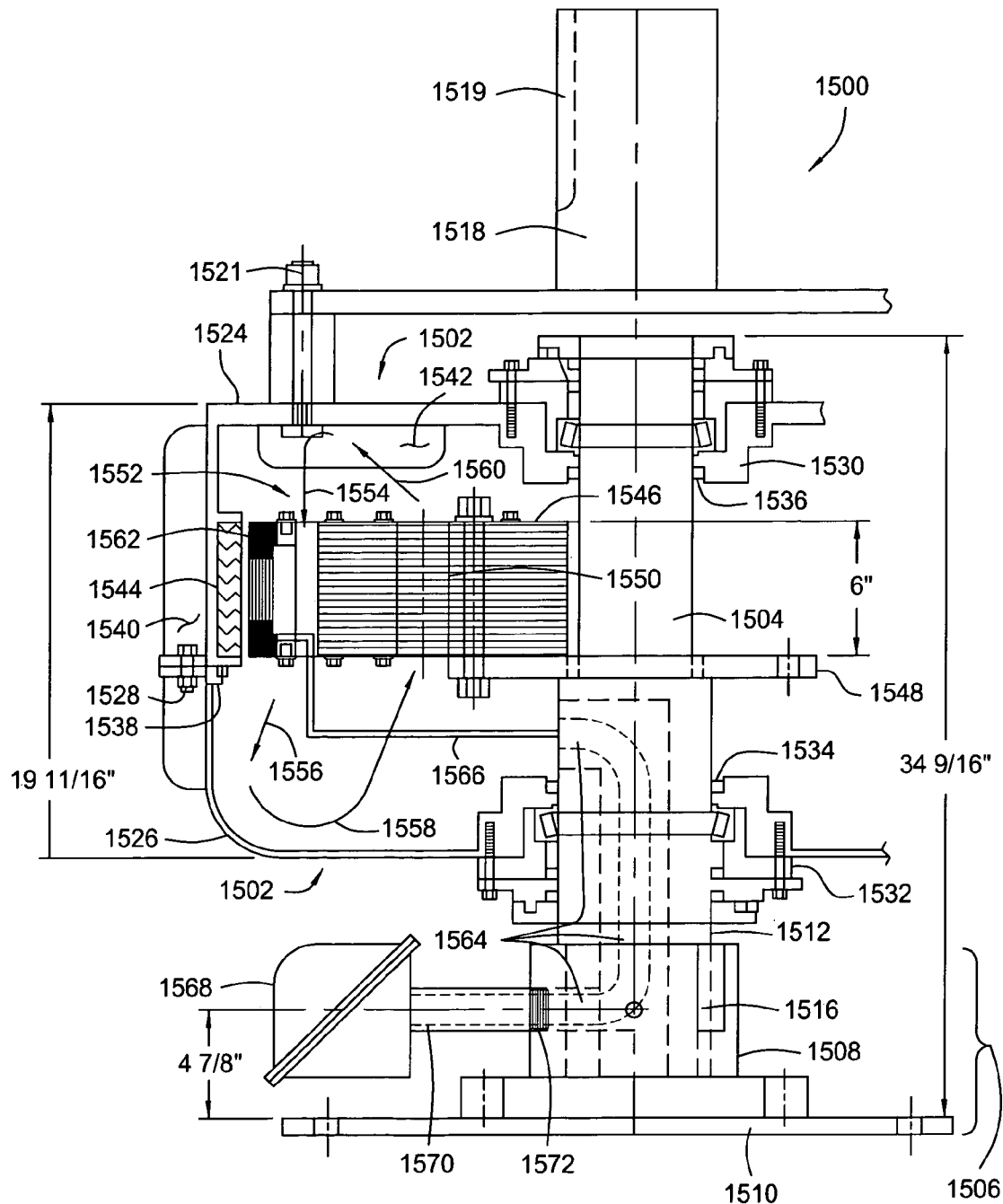
FIGS. 15A and 15B are cross sectional views of an induction motor in accordance with another embodiment of the present invention.
Figure 15B:
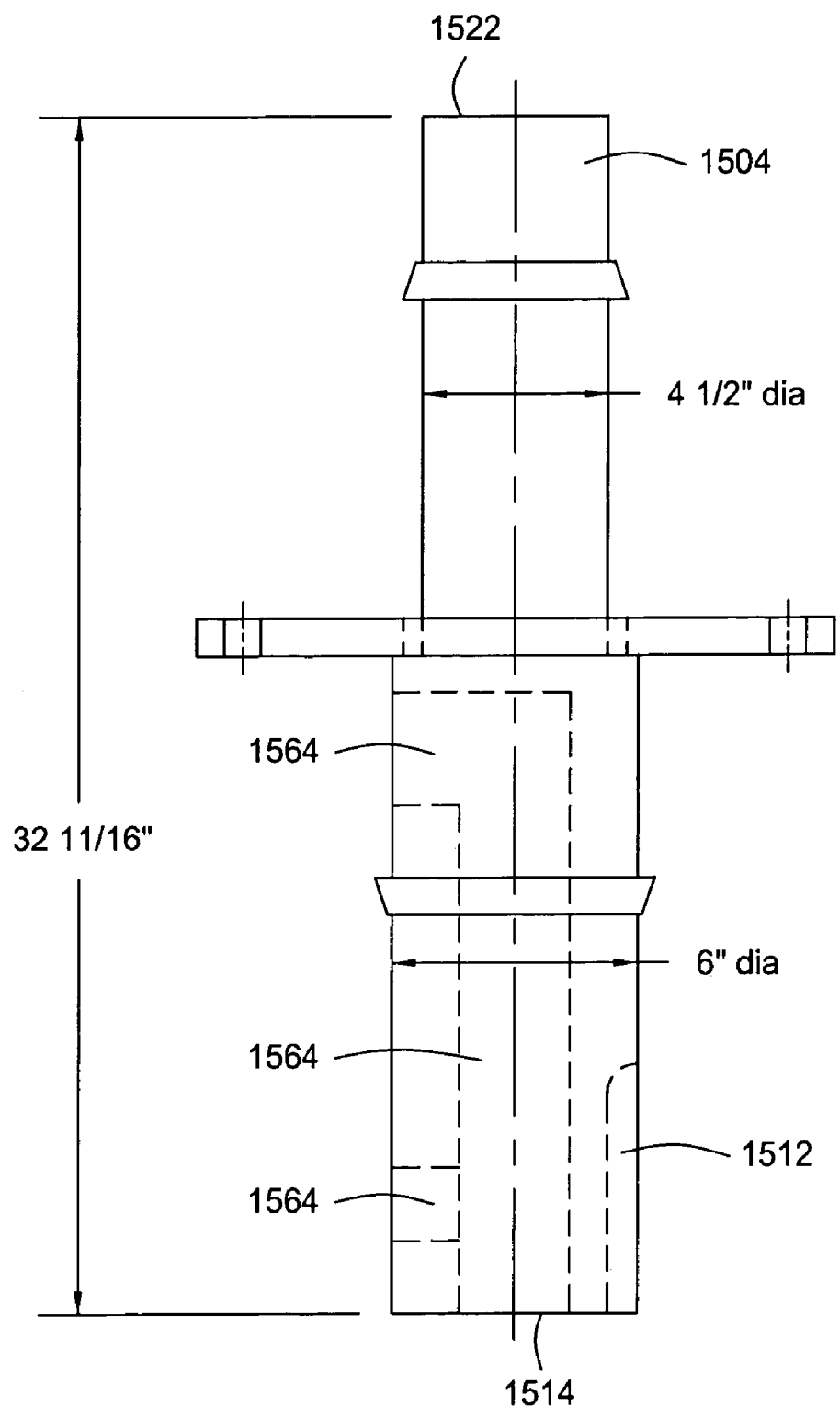

Now referring to FIGS. 15A and 15B, cross sectional views of an induction motor 1500 in accordance with another embodiment of the present invention are shown. The motor 1500 includes a motor hub assembly 1502 axially mounted to a stationary shaft 1504 such that the motor hub assembly 1502 is free to rotate axially around the stationary shaft 1504. The stationary shaft 1504 is securely attached to a mounting assembly 1506, which may include a mounting hub 1508 attached to a basic gear island plate 1510 that allows the motor 1500 to be securely mounted to a support or structure. The stationary shaft 1504 can be securely mounted to the mounting assembly 1506 using a keyway 1512 within a first end 1514 of the stationary shaft 1504 to receive a key 1516 disposed in the mounting hub 1508. One or more fasteners may also be used. A drive shaft or device (e.g., fan, etc.) mounting shaft 1518 is attached to the motor hub assembly 1502 so that the drive shaft or device mounting shaft 1516 rotates with the motor hub assembly 1502 around a second end 1522 of the stationary shaft 1504.

The motor hub assembly 1502 includes an upper motor hub 1524 and lower motor hub 1526 that are connected together with fasteners 1528 and to rotably connected to the stationary shaft 1504 with an upper bearing assembly 1530 (housing and sealed roller bearings) and a lower bearing assembly 1532 (housing and sealed roller bearings), respectively. Other rotating mounting assemblies can be used. In addition, the motor hub assembly 1502 is preferably sealed (e.g., 1534, 1536 and 1538) around the stationary shaft 1504 to reduce or eliminate contaminants and/or moisture from damaging the interior of the motor 1500. The motor hub assembly 1502 also includes one or more exterior cooling fins 1540 and interior cooling fins 1542, and a number of permanent magnets 1544 attached to the interior of the motor hub assembly 1502.

The interior of the motor 1500 includes a metal core 1546 mounted on a core mounting hub 1548 that is securely attached (e.g., welded, etc.) to the stationary shaft 1504. The metal core 1546 may include ventilation holes 1550 and 1552. Arrows 1554, 1556, 1558 and 1560 illustrate the air flow created by the interior cooling fins 1542 as the hub rotates around the stationary shaft 1504. Sealed winding modules 1562 are attached to the perimeter of the metal core 1546 to create and vary the magnetic fields that cause the fan hub assembly 1502 to rotate around the stationary shaft 1504 and drive the drive shaft or device 1518. The motor 1500 will also include various controls. For example, the stationary shaft 1504 may include several bored holes 1564 or other passage way that allows an electrical cable 1566 to run from an all-weather power/control box 1568 connected to the mounting hub 1508 (either directly or via conduit 1570) via opening 1572.

Figure 16A:
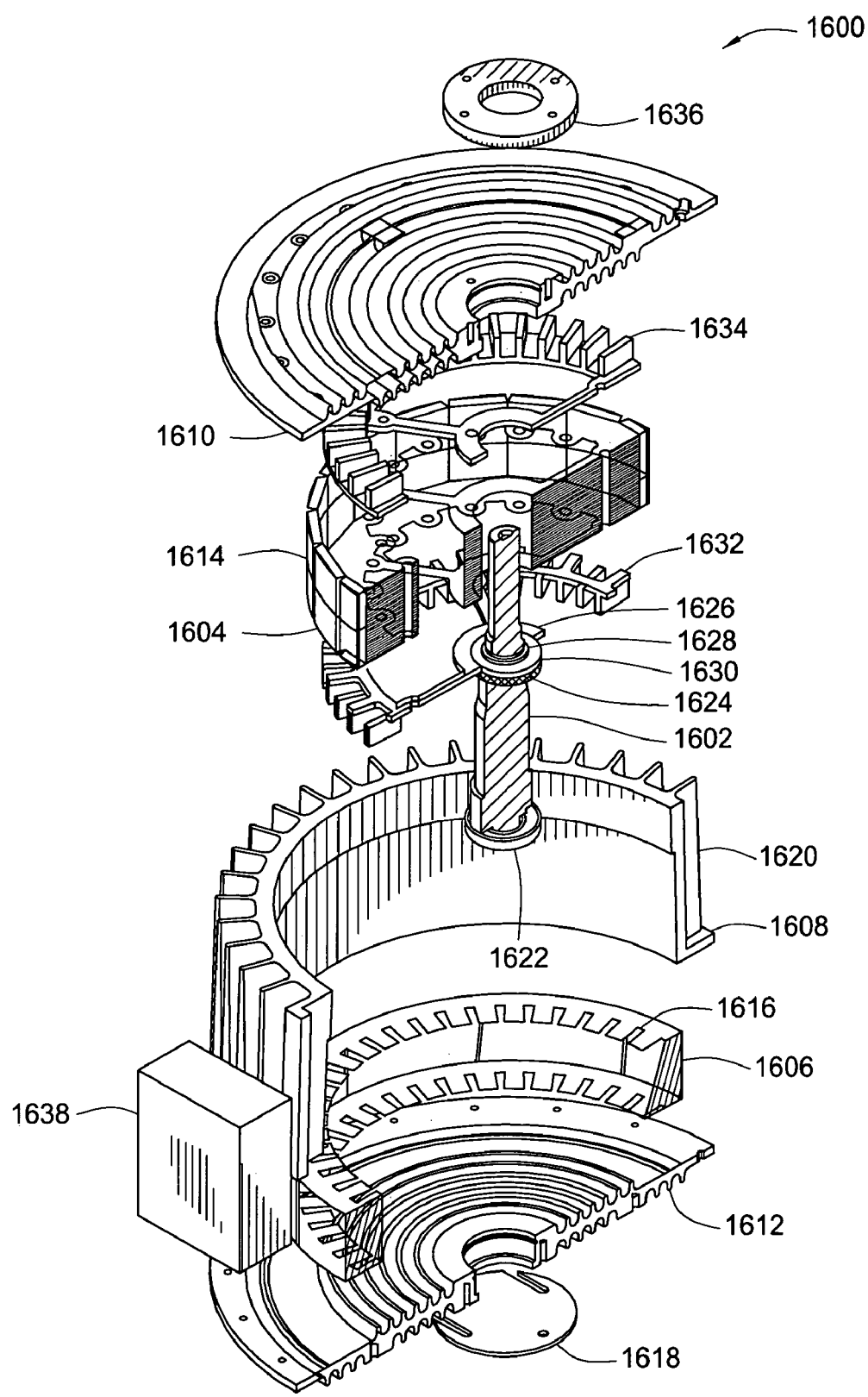
FIG. 16A is an exploded perspective cut away view of an induction motor in accordance with yet another embodiment of the present invention.

Referring now to FIG. 16, an exploded perspective cut away view of an induction motor 1600 in accordance with yet another embodiment of the present invention is shown. The motor 1600 includes a motor housing, a shaft 1602, a rotor 1604 and a stator 1606. The motor housing includes a cylindrical shell 1608, a top flange 1610 and a bottom flange 1612. The shaft 1602 is axially disposed within the cylindrical shell 1608 and extends through the top flange 1610. The rotor 1604 includes one or more sets of radius extenders (e.g., one or more sets of arms, one or more discs, one or more cylinders or a combination thereof) attached to the shaft 1602. The stator 1606 is mounted to the interior of the cylindrical shell 1608 and separated from the rotor 1604 by an air gap. The rotor 1604 typically includes one or more sets of permanent magnets 1614 attached along a perimeter of the radius extenders and at least a portion of the radius extenders is made of a magnetically conductive material. The stator 1606 typically includes a core structure of magnetically conductive material (e.g., iron, a stack of laminated steel sheets, etc.) having a set of slots 1616 arranged on an internal face of the core structure and one or more sets of coils disposed within the slots 1616.

Figure 16B:
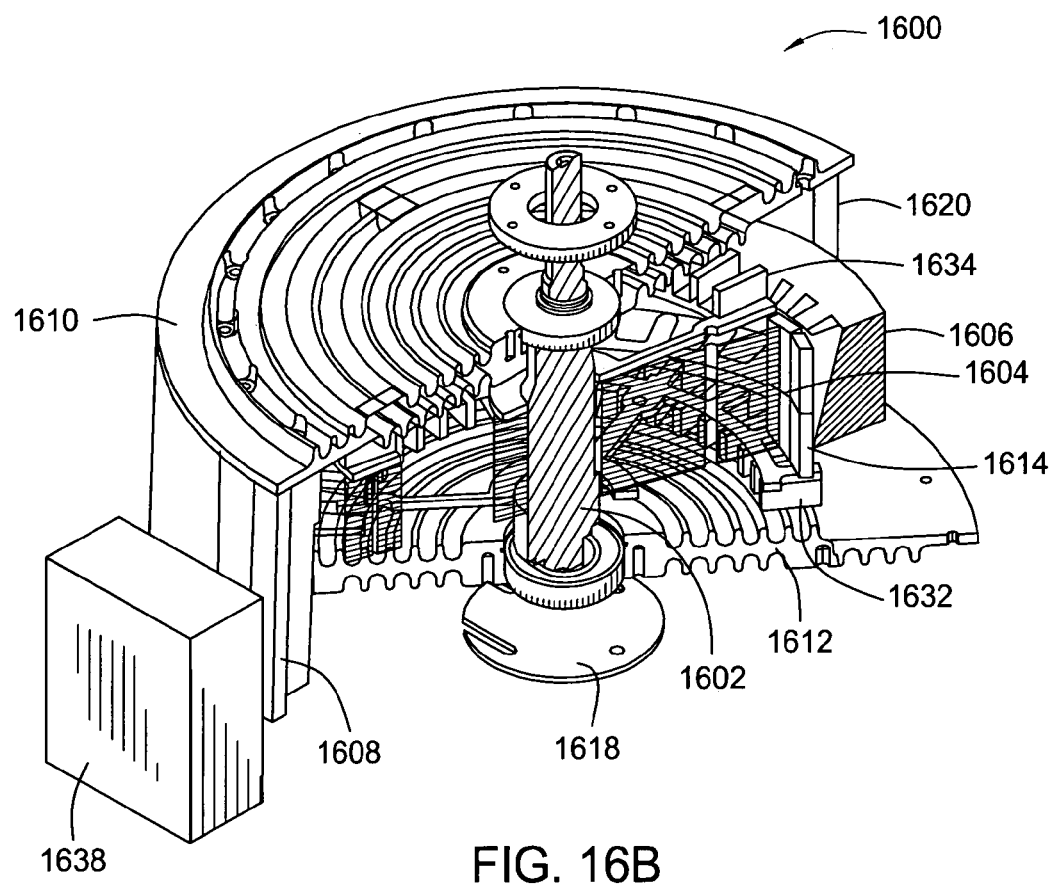
FIG. 16B is a perspective cut away view of the induction motor of FIG. 16A.

The induction motor 1600 also includes a monitor plate 1618, fins and stator supports 1620, a lower bearing 1622, a top bearing 1624, a sling seal 1626, a first seal 1628 and a second seal 1630, a lower fan 1632, a top fan 1634, a top seal plate 1636 and an enclosure. FIG. 16B is a perspective cut away view of the induction motor of FIG. 16A. The construction of the motor 1600 and assembly of these parts can be seen and understood in reference to the remaining FIGURES.

The motor 1600 is designed to fit under the fan in the limited vertical space demanded by the design of a cooling tower, and develop the equivalent torque and revolutions per minute of the current state of the art induction motor and drive assembly (gearbox and shaft). Unlike current systems, the shaft 1602 of this motor 1600 is vertical and drives the cooling tower fan directly. The flux orientation of the motor 1600 is radial. This motor 1600 is cooled by air convection which is facilitated by fins 1620 on the outside of the motor casting parts 1608.

Figure 17A:
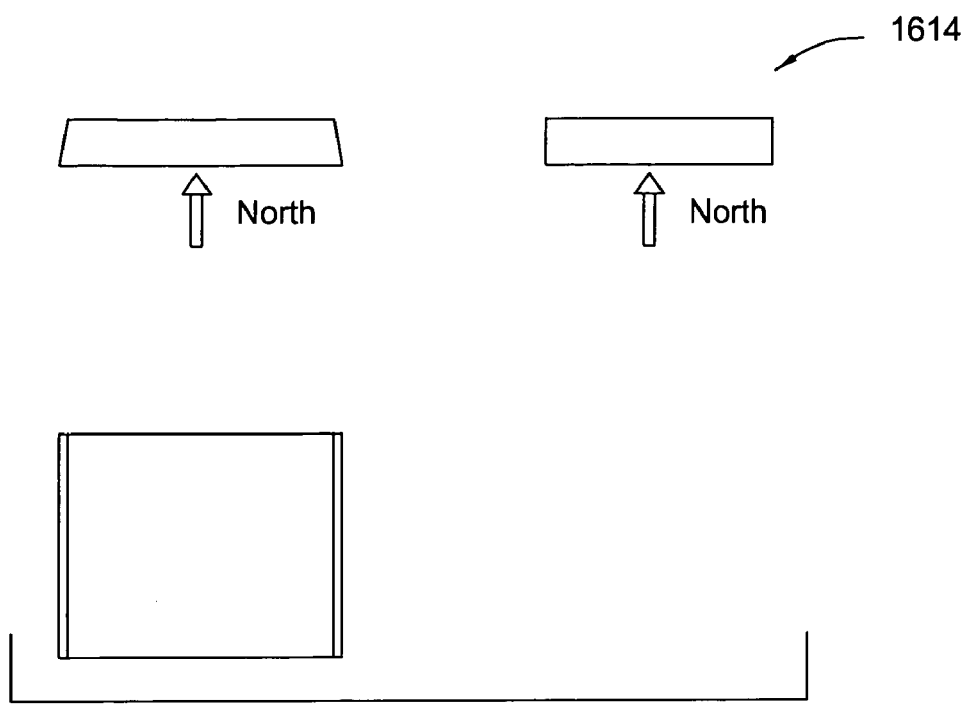
FIGS. 17A and 17B illustrate the shapes of the magnets in the induction motor of FIG. 16A.
Figure 17B:
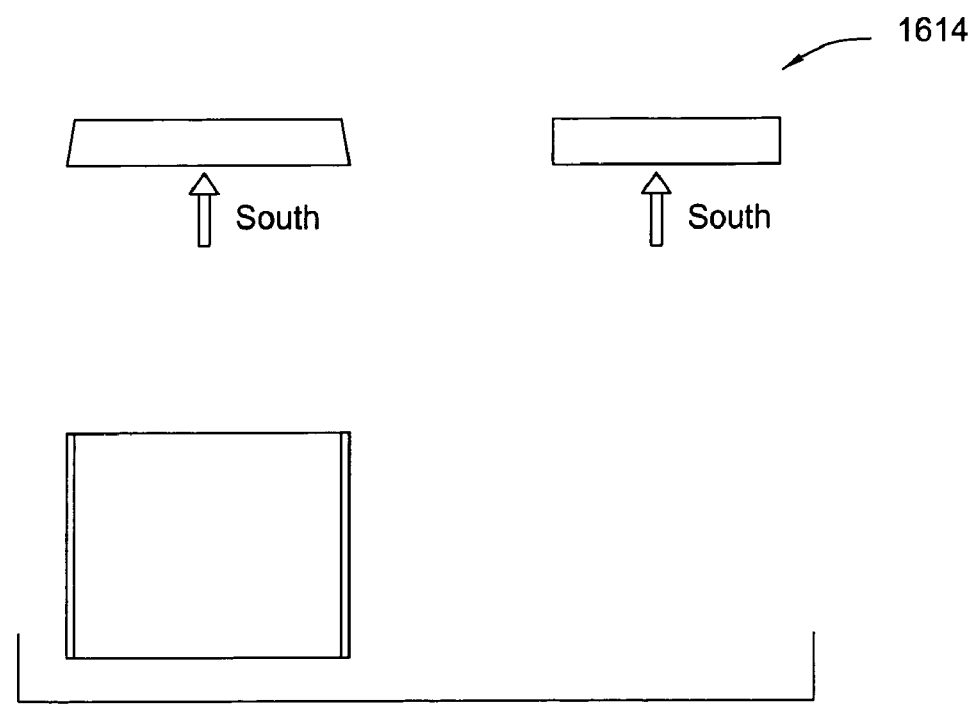

The magnets 1614 can be neodymium magnets or other suitable permanent magnets. The shape of the magnets 1614 are shown in FIGS. 17A and 17B. The magnets 1614 are placed in the rotor 1604. There are north and south poles on the rotor 1604 facing the air gap between rotor 1604 and stator 1606. The laminations for the rotor 1604 and stator 1606 can be silicon steel, "fully processed", non-oriented, with an insulation coating of type C5.

Figure 17C:
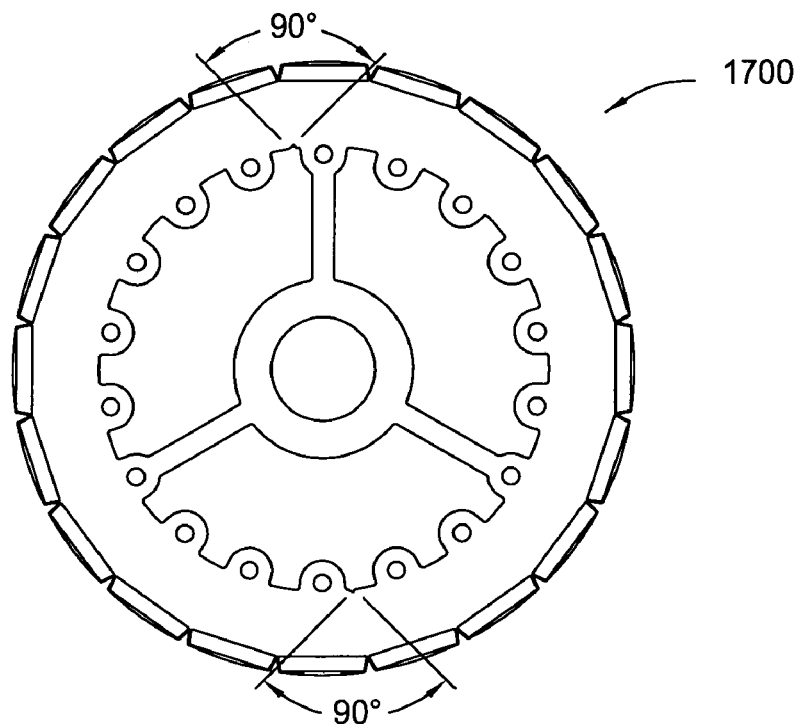
FIGS. 17C, 17D and 17E illustrate various details of the rotor in the induction motor of FIG. 16A.
Figure 17D:
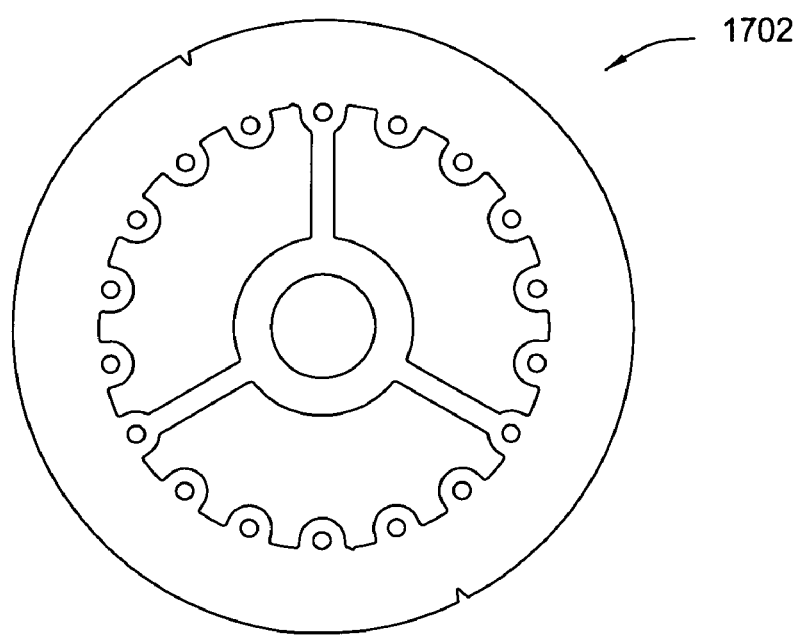
Figure 17E:
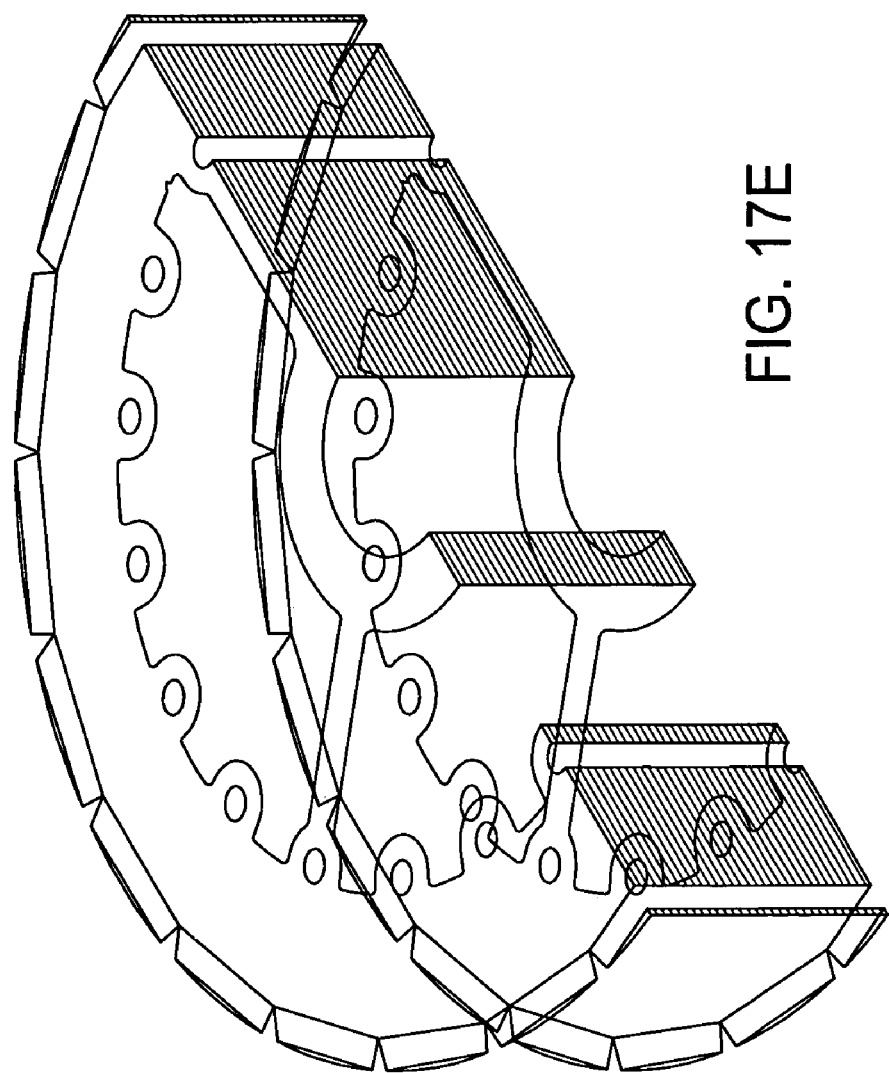
Figure 17F:
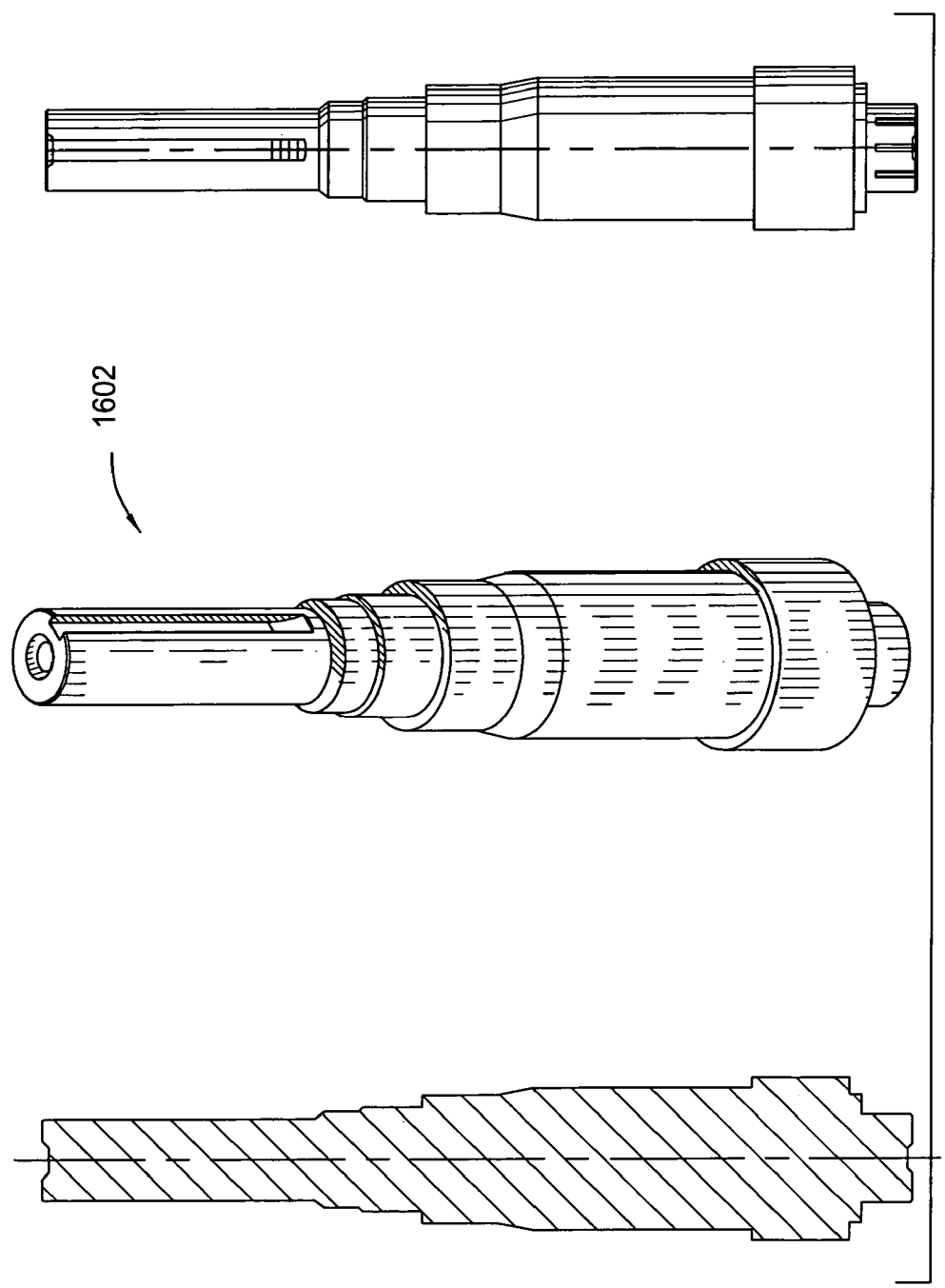
FIG. 17F illustrates the shaft in the induction motor of FIG. 16A.
Figure 17G:
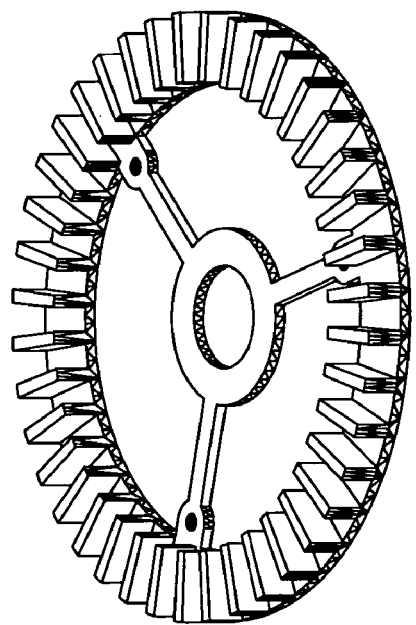
FIGS. 17G and 17H illustrate the fans attached to the top and bottom of the rotor in the induction motor of FIG. 16A.
Figure 17G:
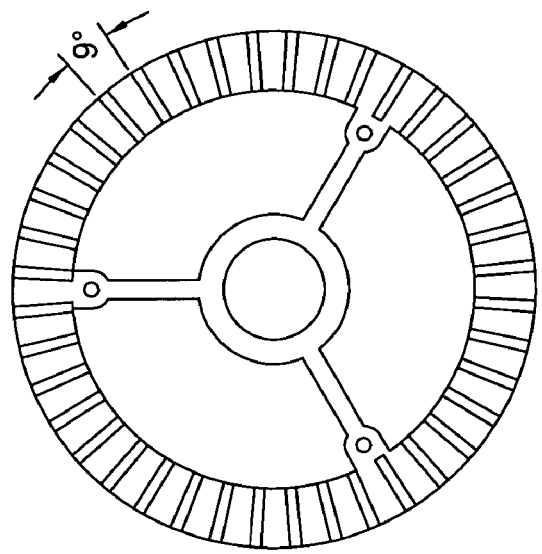
Figure 17G:
Figure 17H:
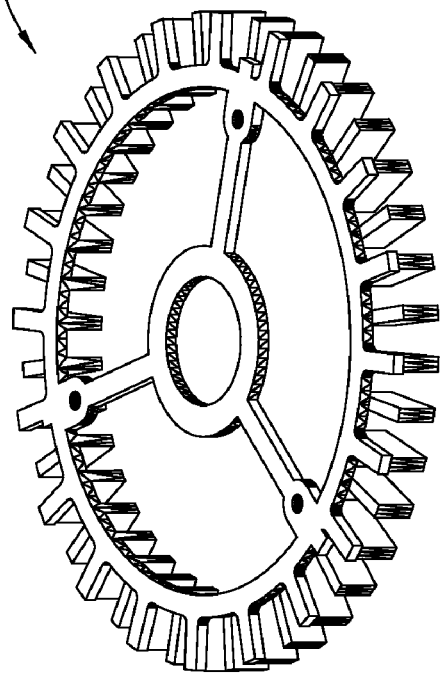
Figure 17H:
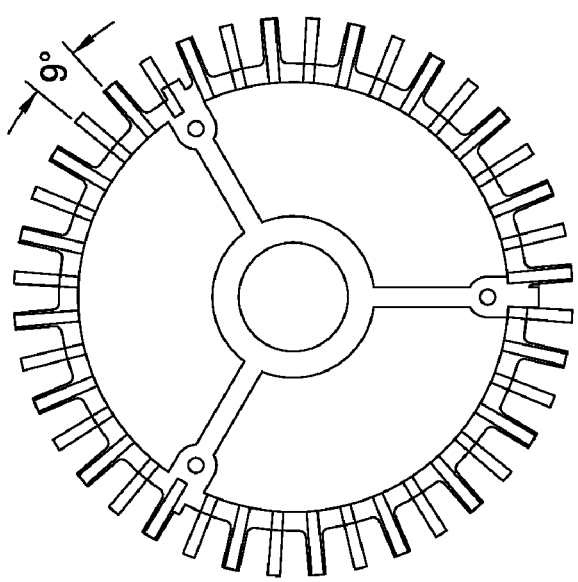

The rotor 1604 is made of a stack of laminations 1700 (FIG. 17C) of silicon steel with slots cut out of the steel laminations for the placement of the magnets 1614. A center plate 1702 (FIG. 17D) separating the two magnets 1604 of each rotor pole is in the axial center of the rotor plate lamination stack FIG. 17E). The shaft 1602 (FIG. 17F) is inserted through the center of the laminations, so that the laminations sit on a lip at the largest diameter portion of the shaft 1602. There are two bearings on the top 1624 and bottom 1622 ends of the rotor shaft 1602 that handle all of the mechanical loading. There are top 1634 (FIG. 17G) and bottom fans 1632 (FIG. 17H) that are attached to the top and bottom of the rotor 1604 respectively. These fans assist in the convective cooling of the motor 1600.

Figure 17I:
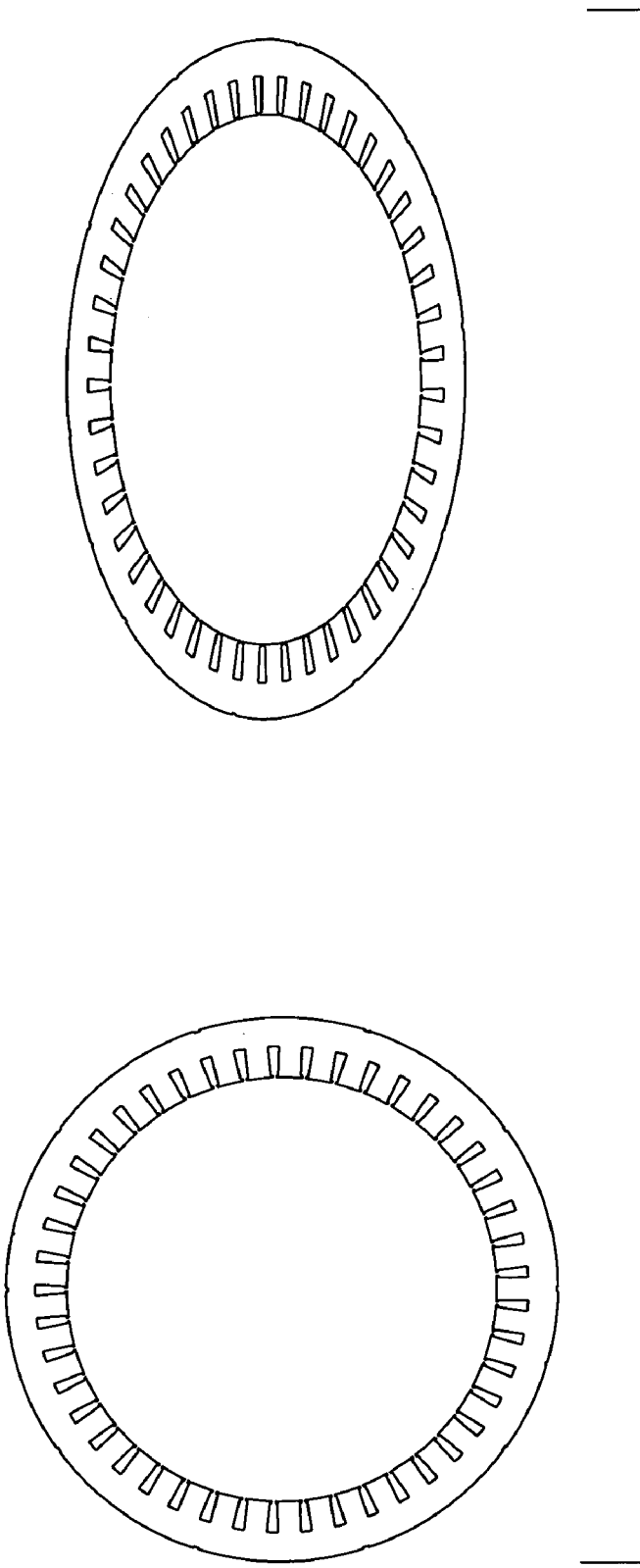
FIGS. 17I, 17J and 17K illustrate various details of the stator in the induction motor of FIG. 16A.
Figure 17J:
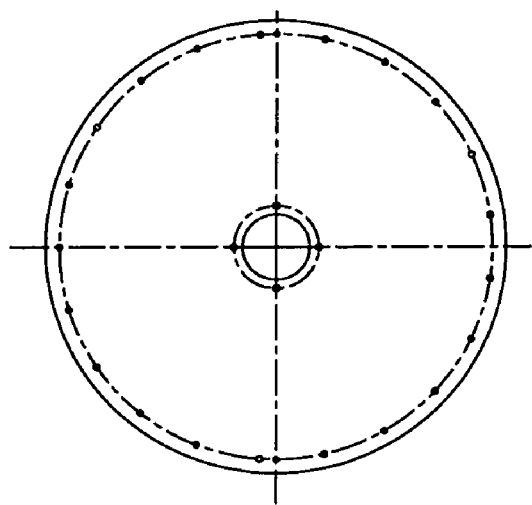
Figure 17J:
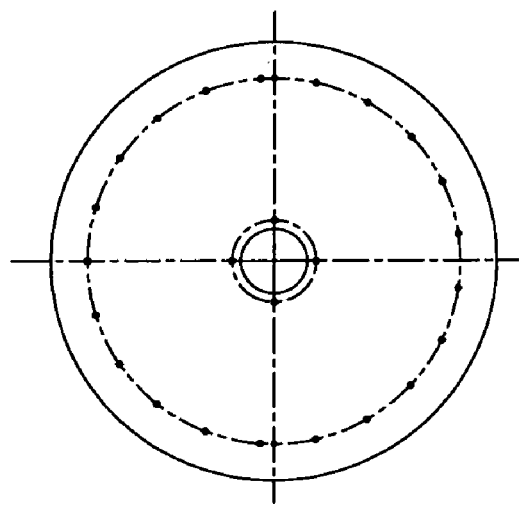
Figure 17J:
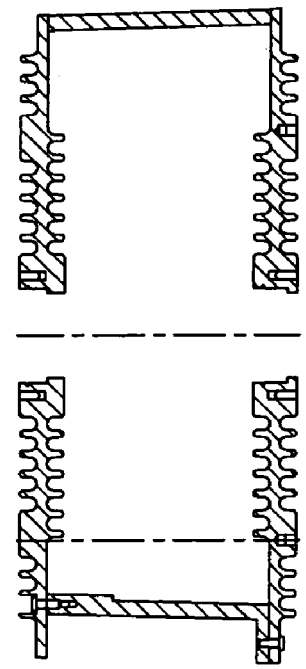
Figure 17K:
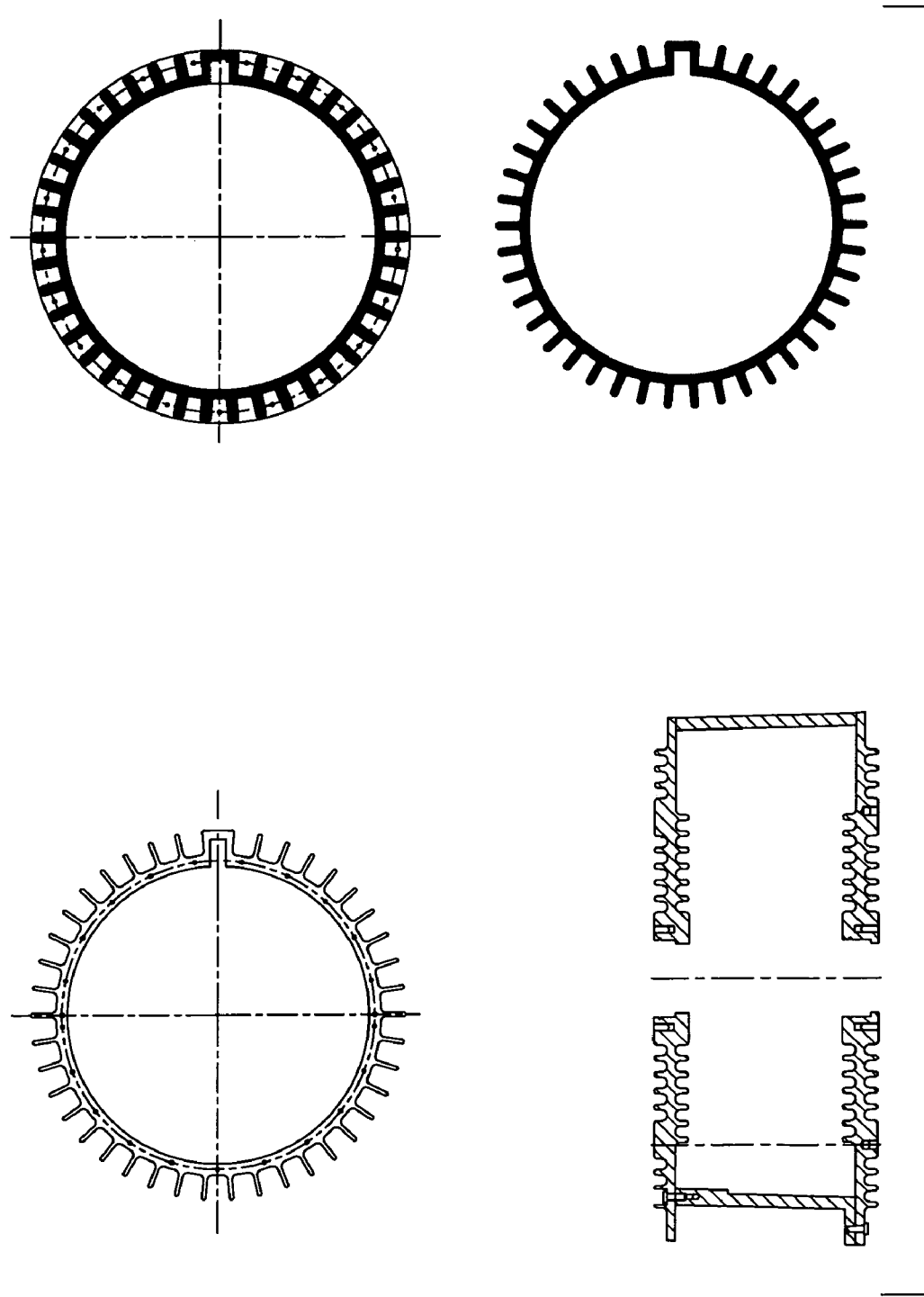

The stator 1605 (FIG. 17I) is made of laminations of silicon steel. The laminations are stacked and placed inside the cylindrical section of the motor housing (FIGS. 17J and 17K) and secured equidistant from each end. The stator 1606 is a conventionally wound armature using winding wire and slot insulators with a conventional varnish coating using a "Vacuum Pressure Impregnation" (VIP) method that is then cured at 275° Fahrenheit.

Figure 17L:
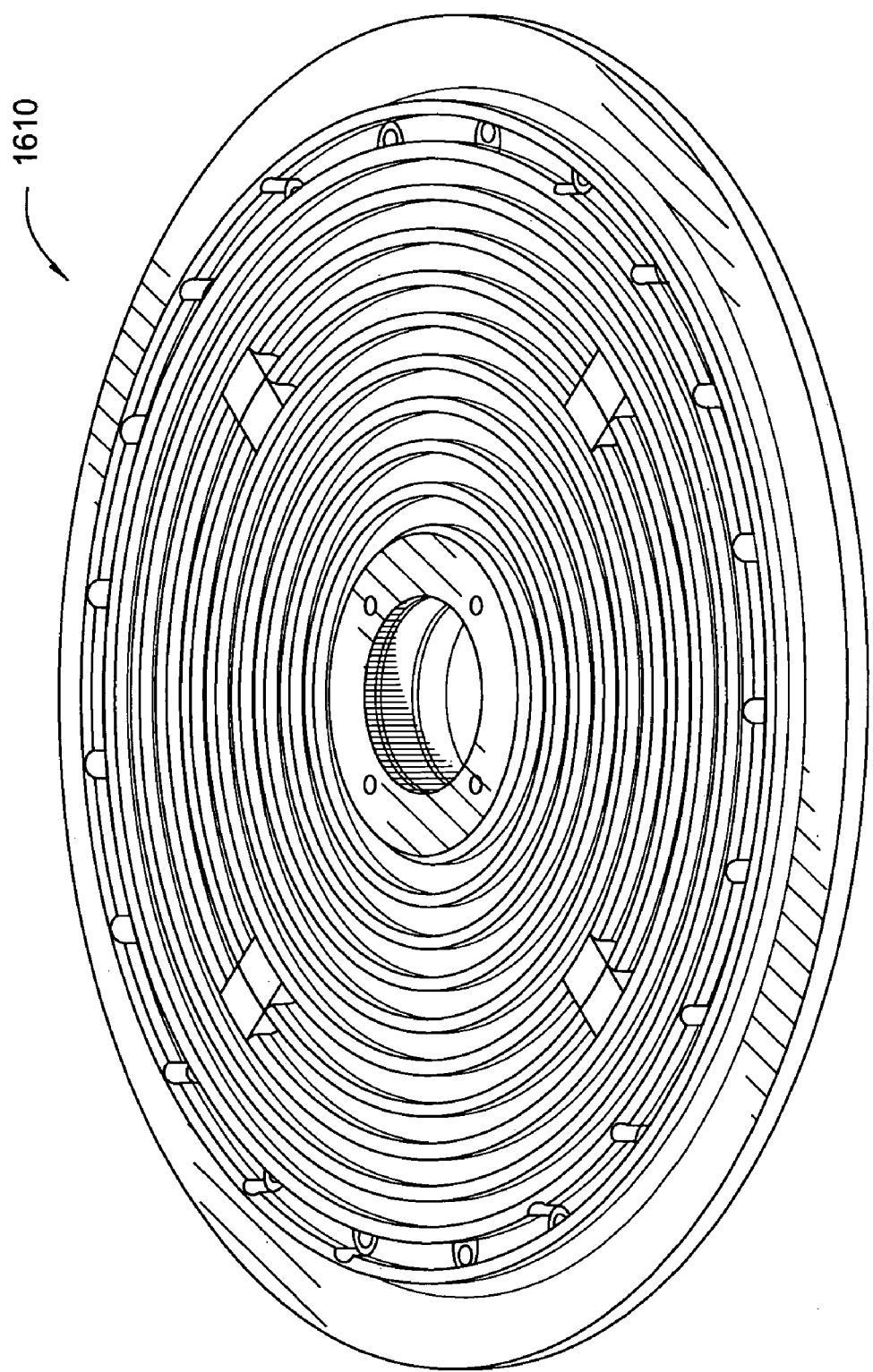
Figure 17M:
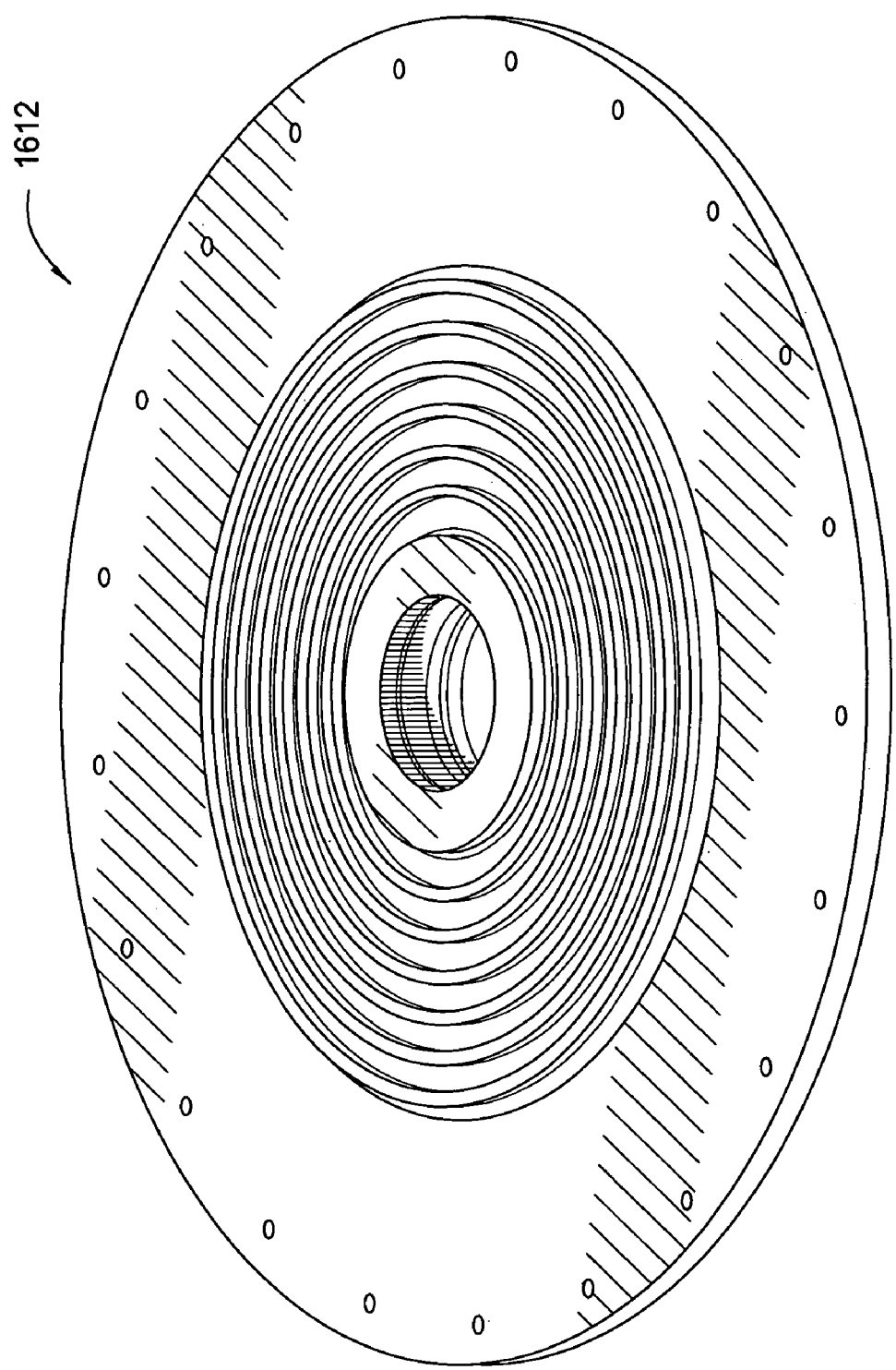

The main motor housing is made of a three piece casting; a cylindrical section 1608 as mentioned above (FIGS. 17J and 17K), a top bearing journal plate 1610 (FIG. 17L) and a bottom bearing journal plate 1612 (FIG. 17M). The top 1610 and bottom journal plates 1612 hold the bearings that the rotor shaft 1602 rides on, and these journal plates will connect to the top and bottom of the cylindrical housing shell casting.

The motor 1600 has a three phase stator which will have thermistors on each phase for temperature feedback for stator overheating. An electrical enclosure 1638 includes a terminal strip for the interconnect between the motor phase power wires and the electric drive circuitry. Any control wires will also connect through this same terminal box. A Quadrature Encoder can be used as input to the control system to control the fan direction and speed at start up. This encoder will be attached to the bottom of the motor in an enclosure.

The Quadrature Encoder can be replaced with feedback from the three phase motor leads combined with software algorithms. The motor 1600 characteristics are shown below:

| | | |
|---|---|---|
| Maximum Input Voltage | 480 Vrms | ±5% |
| Maximum Input Current | 36 A rms | ±5% |
| 60 Hz Input | | |
| NEMA nominal Motor | | |
| Efficiency | ≧82% | |
| Power Factor | ≧88% | |
| Insulation Class | F | |
| Weight | ≦1500 lbs. | |

Minimum sustained output @ motor shaft

| HorsePower | KiloWatts | R.P.M | sustained torque foot-pounds | newton-meters |
|---|---|---|---|---|
| 20 | 14.91 | 250 | 420 | 569.6 |
| 20 | 14.91 | 300 | 350 | 474.7 |

The electric motor drive typically includes a controller module, feedback inputs & associated sensors, and a gate drive circuit to drive Insulated Gate Bipolar Transistors (IGBT). The drive can be optimized for a trapezoidal "back" ElectroMagnetic Force (EMF).

Although preferred embodiments of the present invention have been described in detail, it will be understood by those skilled in the art that various modifications can be made therein without departing from the spirit and scope of the invention as set forth in the appended claims.

What is claimed is:

1. A three phase induction motor comprising:
a motor housing comprising a cylindrical shell, a top flange and a bottom flange;
a shaft axially disposed within the cylindrical shell and extending through the top flange;
a rotor attached to the shaft and disposed between the top flange and the bottom flange, the rotor comprising a top fan attached to a top of the rotor and a bottom fan attached to a bottom of the rotor to create an air flow within the motor housing, a center plate disposed between an upper set and a lower set of radius extenders wherein the center plate, the upper set of radius extenders and the lower set of radius extenders contain openings to allow the air flow to pass through the rotor, an upper set of permanent magnets attached along a perimeter of the upper set of radius extenders and a lower set of permanent magnets attached along a perimeter of the lower set of radius extenders; and a three phase stator mounted to the interior of the cylindrical shell facing the upper and lower sets of permanent magnets and separated from the upper and lower sets of permanent magnets by an air gap, the stator comprising a core structure of magnetically conductive material having a set of slots arranged on an internal face of the core structure and one or more sets of coils disposed within the slots.

2. The motor as recited in claim 1, wherein the radius extenders comprise one or more sets of arms, one or more discs, one or more cylinders or a combination thereof.

3. The motor as recited in claim 1, wherein at least a portion of the upper set and lower set of radius extenders comprise a magnetically conductive material.

4. The motor as recited in claim 3, wherein the magnetically conductive material comprises iron or a stack of laminated steel sheets.

5. The motor as recited in claim 1, further comprising a controller connected to the induction motor.

6. The motor as recited in claim 5, further comprising a computer program embodied on a computer readable medium to control the direction of the fan assembly and speed at start up.

7. The motor as recited in claim 1, wherein the motor drives a fan in a cooling tower.

* * * * *